Jan. 19, 1965  J. C. CLARK  3,166,268
MANUALLY CONTROLLED BRAKE AND CLUTCH FOR A FISHING REEL
Filed Aug. 16, 1962  2 Sheets-Sheet 2

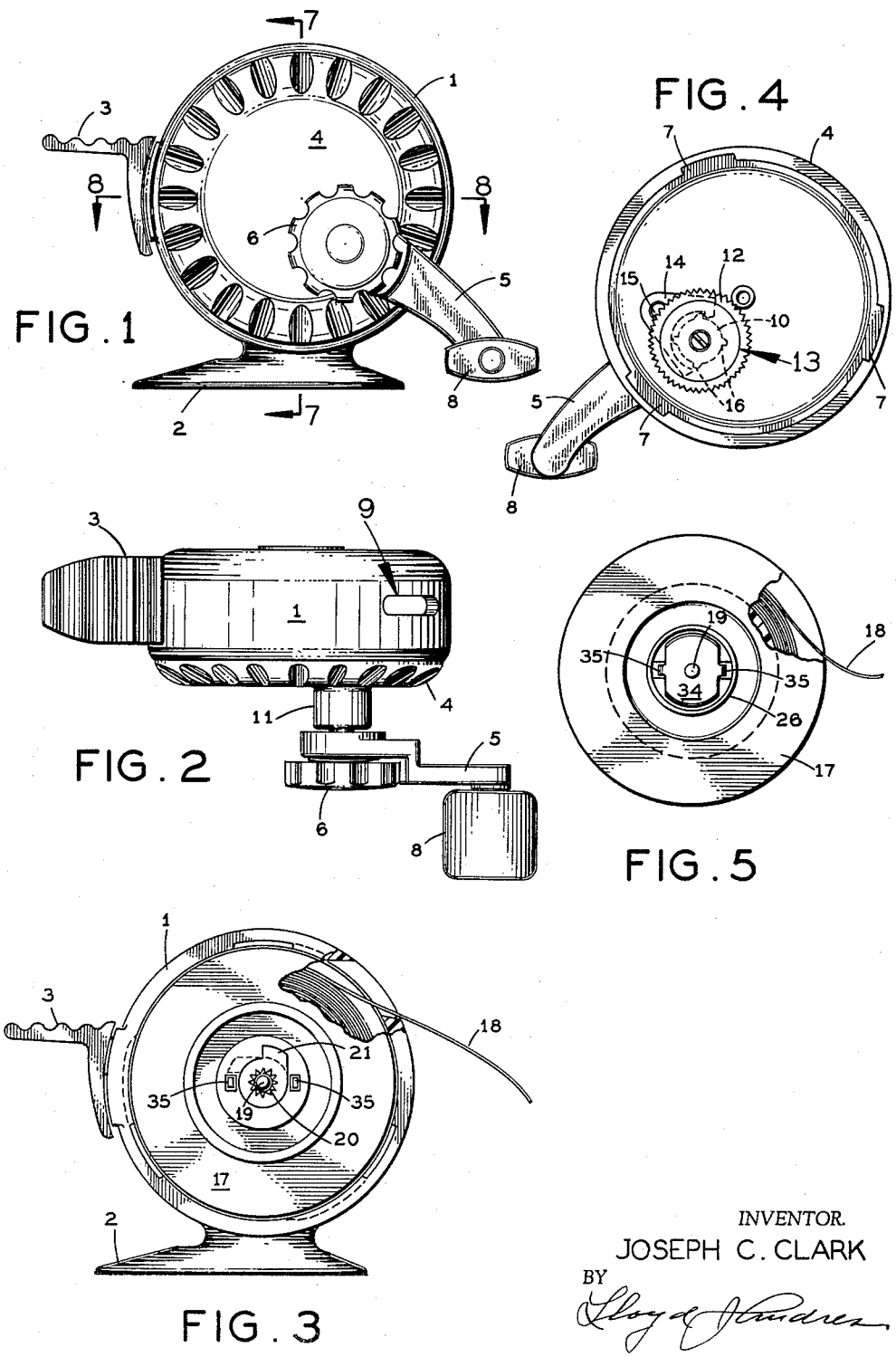

INVENTOR.
JOSEPH C. CLARK
BY
Lloyd Andres

United States Patent Office 3,166,268
Patented Jan. 19, 1965

3,166,268
MANUALLY CONTROLLED BRAKE AND CLUTCH
FOR A FISHING REEL
Joseph C. Clark, Orlando, Fla., assignor to L & S Bait
Company of Florida, Inc., Clearwater, Fla., a corporation of Florida
Filed Aug. 16, 1962, Ser. No. 217,442
2 Claims. (Cl. 242—84.44)

This invention relates in general to finishing reels and in particular to a semi-automatic reel with the spool thereof enclosed by a housing and controlled by a thumb lever and a uni-directional crank means including a drag control rotatable therewith.

Reference is had to applicant's co-pending application Serial Number 29,703, now Patent No. 3,061,232.

Reels prior to this invention usually employed positive coupling between the crank, gear means and the spool and usually included independent means for locking the spool against rotation and applying drag thereto. Clutch means used in prior reels for disconnecting the crank during casting did not disconnect the transmission means and hence undesirable friction and inertia forces limited the operation of the spool during a cast.

The present invention overcomes the above objections and disadvantages by the provision of a relatively simple low-cost reel which is readily demountable without tools for inspection and cleaning and which includes a convenient thumb lever shiftable from a neutral free spool position to an upward position for operating a clutch means engaging the spool with a uni-directional crank and transmission means. The thumb lever is also adapted for movement from neutral in a downward direction for applying a brake directly to the spool for snubbing and for accurately stopping the line at a predetermined distance when the line is cast.

A further object of the invention is the provision of the clutch means in a reel for engaging a normally free spool with a winding transmission when a thumb lever is shifted from a neutral to a predetermined displaced position including detent means for yieldably holding the thumb lever in said displaced position.

Another object of the invention is the provision of a thumb lever extending from a reel housing which includes a clutch operating means and a brake means for engaging a crank operated transmission to a spool when moved in one direction from a neutral position for winding a line when the crank is rotated and for braking the rotation of said spool when said lever is moved from neutral position in opposite direction.

These and other objects and advantages in one embodiment of the invention are described and shown in the appended specification and drawings in which;

FIG. 1 is a right side elevation of the reel.

FIG. 2 is a top plan view of the reel shown FIG. 1.

FIG. 3 is same as FIG. 1 with cover removed showing right side of spool.

FIG. 4 is an inside elevation of the cover of the reel shown FIG 1.

FIG. 5 is a fragmentary left side elevation of the spool shown FIG. 3.

Figure 6:
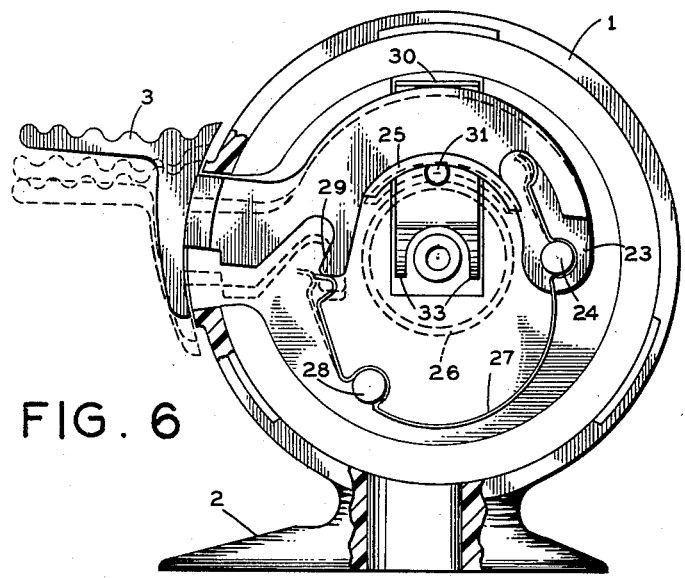
FIG. 6 is an enlarged view same as FIG. 3 with spool removed.

Referring to FIGS. 1 and 2 a body or housing 1 includes an integral foot member 2 adapted to be secured on a conventional casting rod. A thumb lever 3 extends through an aperture in the housing and is adapted for movements to three positions to be hereinafter described. A cover 4 in which is journalled crank 5 and a drag control knob 6 is quick detachably secured in housing 1 by lugs 7 which are adapted to engage slots in housing 1, not shown, in the form of a breech block type closure. A winding handle 8 is journalled on the outer end of crank 5 as shown. An aperture 9 through the housing as shown in FIG. 2 serves as a guide for the line.

Referring to FIGS. 2 and 4, the crank shaft 10 secured into crank 5 is journalled for rotation in boss 11 integral with the cover 4 and is adapted to rotate gear 12 through the medium of a conventional disc type friction clutch 13, not shown, the degree of friction slippage or drag of the clutch is adjusted by the rotation of knob 6 by well known means. A pawl 14 is pivotally secured to the cover on a boss 15 and includes a pair of spaced abutments adapted and positioned to alternately engage teeth 16 integral with the crank shaft 10. Thus the winding crank may be rotated in a clockwise direction as viewed in FIG. 1 but is effectively prevented from counter rotation by the engagement of pawl 14 with teeth 16.

Figure 7:
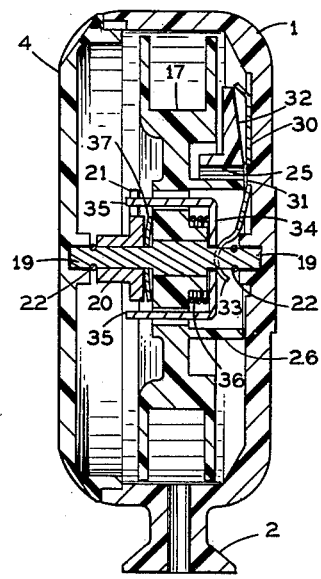
FIG. 7 is a cross-sectional view taken through section line 7—7 FIG. 1.
Figure 8:
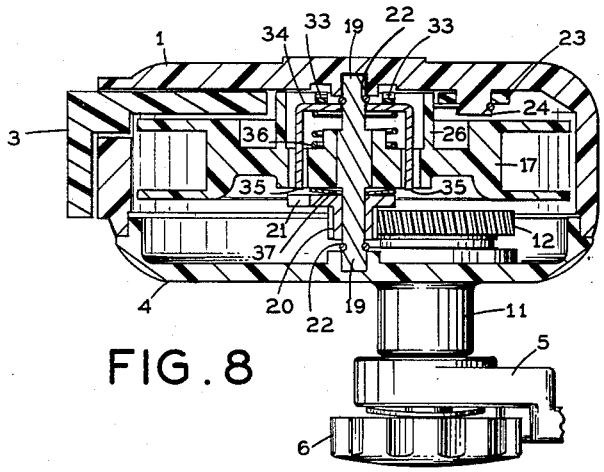
FIG. 8 is a cross-sectional view taken through section line 8—8 FIG. 1.

A spool 17 has a line 18 wound thereon between integral flanges, as shown, and has an axle 19 secured coaxial therewith with the outer ends thereof journalled in the housing and cover respectively, as shown, in FIGS. 7 and 8.

Referring to FIG. 3 a pinion 20 having a clutch dog 21 secured thereto is retained for rotation on axle 19 by ring 22 shown in FIGS. 7 and 8. The gear 12 is adapted to mesh with pinion 20 whereby uni-directional rotation of crank 5 will normally rotate the spool 17 depending upon the engagement of the clutch dog 21 to be hereinafter described.

Referring to FIGS. 6 and 7 the inner end 23 of thumb lever 3 is pivoted on a boss 24 integral with housing 1. An arcuate brake shoe 25 integral with lever 3 is positioned to engage the brake drum 26 integral with the spool when lever 3 is moved downward from a neutral position. A spring 27 retained about bosses 24 and 28 has the upper end thereof positioned in a pocket in lever 3 for normally urging the latter upward into neutral position. The opposite end of spring 27 is formed into a V to engage a projection 29 on lever 3 as a detent means for yieldably holding the lever in either a central or upper position as shown in dotted and full lines respectively.

A yoke 30, shown in FIGS. 6 and 7, is loosely retained on a boss 31 and pivoted against the housing with the upper end thereof positioned between an inner surface of the housing 1 and a cam surface 32 on lever 3 whereby the movement of thumb lever 3 to its upward position will cam against the upper end of yoke and move the lower forked ends 33—33 laterally toward the spool 17.

Referring to FIGS. 5 and 7 a driven clutch member 34 having a pair of integral projections 35—35 is slidably positioned on axle 19 whereby the lateral movement thereof will project the projections through suitable opposite apertures in the spool and into the path of rotation of dog 21, while in constant driving relation with the spool, better shown in FIGS. 3 and 7. A coil spring 36 is positioned coaxial around axle 19 between the spool and member 34 for normally urging clutch member 34 into the position shown FIG. 8 with the projections 35 withdrawn from the path of movement of dog 21. A ring 22 on axle 19 provides a stop for the disengaged position of the clutch member 34 when lever 3 is moved to its neutral position. A friction washer 37 is provided on axle 19 between dog 21 and the spool to add predetermined friction resisting the rotation of the spool for minimizing backlash effect.

Figure 9:
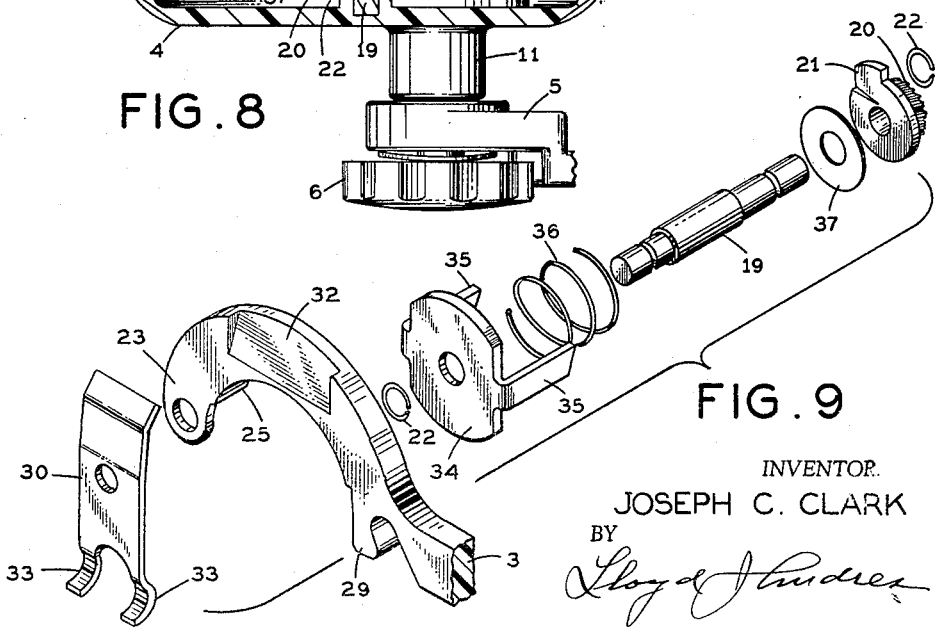
FIG. 9 is an exploded view of elements shown in FIGS. 6 and 7.

The exploded view, FIG. 9 illustrates the elements in their working relation involved in the lever operated clutch means for engaging and disengaging the spool from the crank and gear train.

It is to be noted that the projections 35 on the clutch member 34 are positioned exactly opposite each other in order to provide engagement by the dog 21 at each 180 degrees of rotation thereof and to maintain dynamic balance of the spool when rotated by the projections 35.

In operation and under the assumption thumb lever 3 is moved to its upward position, then one of the projections 35 will be engaged by dog 21 and the gear train and crank effectively engaged with the spool and since the crank cannot rotate in a counter direction, by virtue of the operation of the pawl 14, the line will be locked on the spool to the extent of the adjustment of the drag control knob.

When the thumb lever is moved to its central or neutral position the spool clutch is disengaged and the spool is free to rotate with the minimum of friction, plus that intentionally applied by washer 37.

It is to be noted that a washer 37 provides a predetermined retardant friction to the rotation of the spool only during a cast for minimizing backlash. When the spool is rotated by the crank the washer 37 is ineffective for the reason that the dog 21 and the spool rotate in unison.

When a cast is to be made, the thumb lever is depressed downward from neutral which will move the brake shoe 25 into frictional contact with the brake drum 26 of the spool and effectively locks the line, and during the cast, the thumb lever is released permitting the inertia of the bait to unwind the line from the now free-running spool. The thumb lever is then again depressed near the completion of the cast in order to brake the cast and drop the bait at a desired distance. It is apparent that during the casting of the line the spool, its axle and the balanced driven clutch assembly are the only rotating parts.

Following the cast the thumb lever is moved to its upward position, engaging the spool clutch, and the crank rotated, which will rewind the line on the spool under the biasing tension of the drag clutch 13 which is under the control of knob 6. In the event a strike is made during the reeling operation the catch may be played without regard to the crank since counter rotation is prevented by pawl 14 and the degree of drag for playing the catch is readily controlled by manipulating knob 6.

It is to be noted that when trolling or during the reeling in of the line a snag is encountered, the drag clutch 13 will permit unwinding of the reel under predetermined tension and thereby prevent breaking of line, loss of bait and/or loss of rod and reel.

It is understood that certain modifications to the above construction utilizing the features described are intended to come within the scope of the appended claims.

Having described my invention, I claim:

1. A fishing reel comprising means forming a housing, a spool means secured for rotation on a coaxial axle journalled in said housing for casting and retracting a line wound thereon when rotated in opposite directions respectively, a brake drum on said spool means coaxial therewith for braking said spool means against rotation, a manual crank and gear means journalled for rotation in said housing including uni-directional means associated therewith for permitting rotation of said crank and gear means in only one direction, a pinion meshed with said gear means and journalled for rotation thereby on said axle including a clutch drive dog extending radially therefrom for rotation in a path coaxial with said axle, a driven clutch member in slidable lateral engagement with said spool means slideably retained on said axle for axial reciprocation thereon from an idle position to a drive position in the said path of said dog for engagement therewith for rotating said spool, spring means for urging said member into said idle position, a thumb lever pivoted in said housing for movement from a neutral free spool position in opposite directions to a reeling and a brake position respectively, a combination spring and detent means operatively associated with said lever and said housing for urging said lever from said brake into said neutral position and for yieldably holding said lever in said reeling position respectively, said lever having a brake surface thereon positioned to frictionally engage said drum when said lever is moved to said brake position for braking and stopping said spool means from rotation by said line, a rocker member operatively associated with said lever and said housing and said clutch member positioned and adapted to move the latter from said idle to said drive position when said lever is moved from said neutral to said reeling position whereby the engagement of said dog with said clutch member will rotate said spool means and wind said line thereon when said crank means is rotated and whereby said uni-directional means will prevent counter rotation of said spool means when said line is constrained from said reel.

2. In a reel of the character described a means forming a housing, a spool secured for rotation in said housing about the axis thereof on a coaxial axle journalled at opposite ends thereof in said housing for casting and retracting a line wound thereon, a clutch drive dog journalled for rotation on said axle and retained between one side of said spool and said housing, a driven clutch member slideably retained on said axle on the opposite side of said spool including a pair of integral spaced projections extending therefrom parallel and equi-spaced from said axis at opposite sides of said axle and slideably retained in corresponding apertures through said spool, said member operatively positioned for reciprocation from a retracted idle position for free spool rotation to an extended drive position with each of said projections in the said path for rotation by said dog for engaging and rotating said spool when said dog is rotated, means for urging said member into said idle position, a manual crank means journalled in said housing and coupled to said dog for rotating same when operated, a thumb lever pivoted in said housing for movement from a neutral to a reeling position, detent means operatively associated with said lever and said housing for yieldably holding said lever in said reeling position, rocker means operatively associated with said lever and pivoted against said housing for engaging and moving said clutch member into said drive position when said thumb lever is moved into said reeling position.

References Cited by the Examiner
UNITED STATES PATENTS

| 796,205 | 8/05 | Graham et al. | 192—67 |
|---|---|---|---|
| 1,991,407 | 2/35 | Miller | 242—84.44 |
| 2,009,356 | 7/35 | Seversky. | |
| 2,536,583 | 1/51 | Tank | 242—84.44 |
| 2,984,432 | 5/61 | Clark | 242—84.53 X |
| 3,061,232 | 10/62 | Clark | 242—88.44 |

FOREIGN PATENTS 27,417    1902    Great Britain.

MERVIN STEIN, *Primary Examiner.*
RUSSELL C. MADER, *Examiner.*